United States Patent
Wang

(10) Patent No.: US 6,173,040 B1
(45) Date of Patent: Jan. 9, 2001

(54) TELEPHONE LINE STATE DETECTING DEVICE

(75) Inventor: Gary Wang, Taipei Hsien (TW)

(73) Assignee: Well Communication Co., Taipei Hsien (TW)

(*) Notice: Under 35 U.S.C. 154(b), the term of this patent shall be extended for 0 days.

(21) Appl. No.: 09/286,933

(22) Filed: Apr. 7, 1999

(51) Int. Cl.[7] .............................. H04M 1/24; H04M 3/08; H04M 3/22

(52) U.S. Cl. .......................... 379/21; 379/377; 379/381; 379/382; 379/396

(58) Field of Search .................................. 379/21, 27–29, 379/30, 32, 90.01, 381–382, 396

(56) References Cited

U.S. PATENT DOCUMENTS

| 4,600,810 | * | 7/1986 | Feldman et al. | 379/21 |
| 4,686,700 | * | 8/1987 | Perry | 379/183 |
| 4,734,933 | * | 3/1988 | Barsellotti et al. | 379/164 |
| 5,218,616 | * | 6/1993 | Stephens | 379/27 |
| 5,668,870 | * | 9/1997 | Dahlquist | 379/377 |
| 5,706,342 | * | 1/1998 | Beader et al. | 379/382 |

* cited by examiner

Primary Examiner—Duc Nguyen
(74) Attorney, Agent, or Firm—Dougherty & Troxell

(57) ABSTRACT

A telephone line state detecting device that is connectedly provided with a hardware detecting circuit when a telephone line is connected to a modem. The hardware detecting circuit is connected to a processing unit such that, in use, the hardware detecting circuit can detect pulses generated by voltages flowing through the telephone line. The pulses are being processed by the processing unit to judge whether the telephone is disconnected or the electrical contact thereof is deficient, or whether the telecommunications equipment used in conjunction therewith is busy or not in use.

4 Claims, 1 Drawing Sheet

TELEPHONE LINE STATE DETECTING DEVICE

BACKGROUND OF THE INVENTION (a) Field of the Invention

The present invention relates to a telephone line state detecting device that primarily detects whether a telephone line is generating pulses to determine whether the telephone line is disconnected or the electrical contact thereof is poor, or whether the telecommunications equipment used in conjunction therewith is busy or not in use.

(b) Description of the Prior Art:

The major function of a telephone line is to convert signals and to enable the user to communicate with the outside. However, the conventional telephone line in general can only let the user know whether a telephone call is successfully connected. The user is unable to know the state of the telephone line or the use status thereof.

SUMMARY OF THE INVENTION

A primary object of the present invention is to provide a telephone line state detecting device that includes a hardware detecting circuit provided in a telephone line connected to a modem. The hardware detecting circuit is connected to a processing unit. In use, the hardware detecting circuit detects pulses generated by voltages flowing through the telephone line, which are processed by the processing unit to determine whether the line is interrupted or electrical contact thereof is poor, or whether the telecommunication equipment used in conjunction therewith is busy or not in use.

Another object of the present invention is to provide a telephone line state detecting device that includes a processing unit provided with a ROM for storing relevant data. After processing the pulses generated by the voltages flowing through the telephone line, the processing unit can, based upon the data stored in the ROM, determine whether or not to actuate the hardware detecting circuit.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
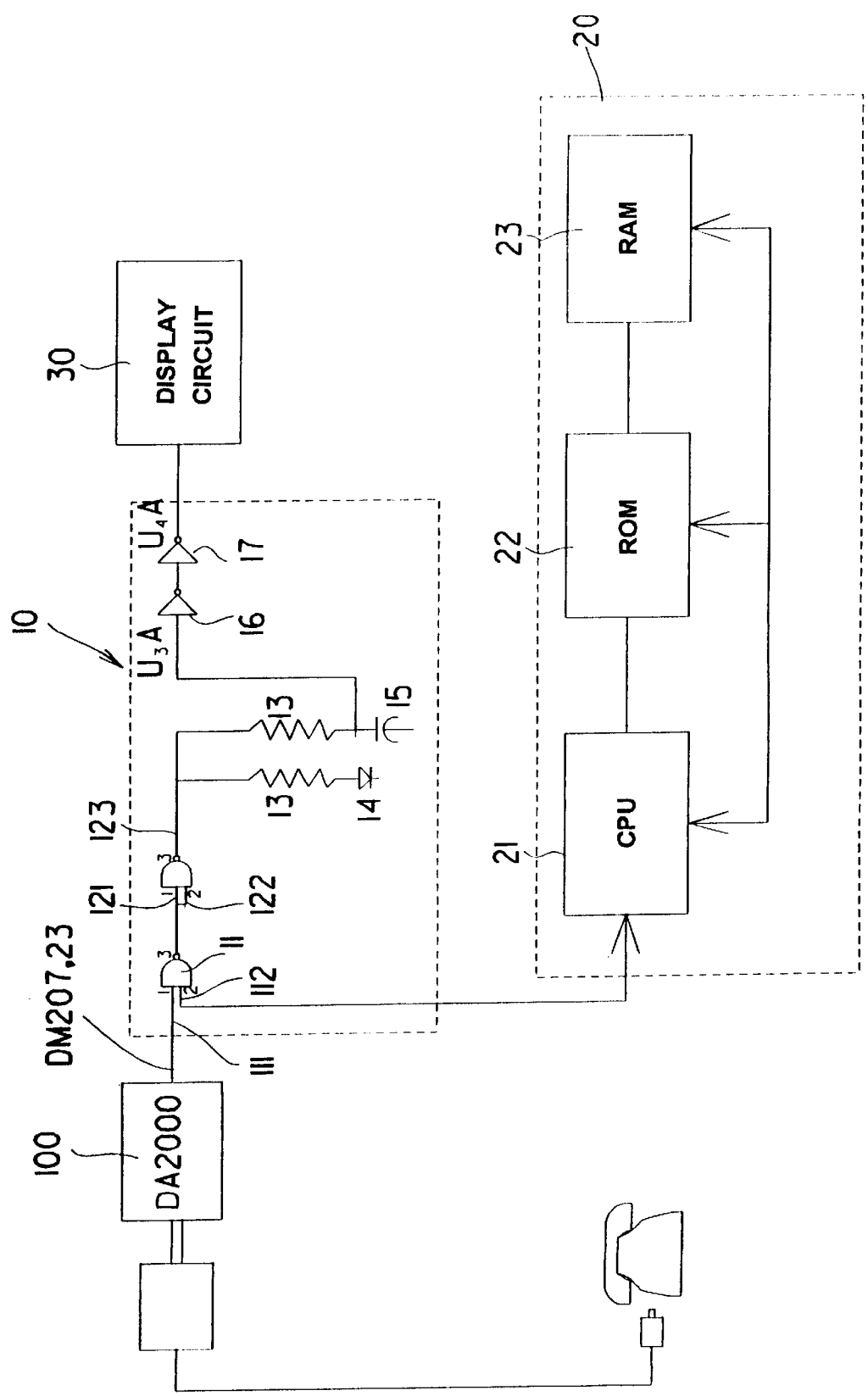
FIG. 1 is a schematic view of the circuitry of the present invention.

With reference to FIG. 1, a telephone line state detecting device according to the present invention is a device that utilizes the pulses emitted by a telephone line to judge the state of use of the telephone line. The device is provided with a hardware detecting circuit 10, which is provided with a first counter-amplifier 11. The first counter-amplifier 11 has a first leg 111 connected to a signal line of a modem 100. In this embodiment, the telephone line is a DAA 2000 series one. The first counter-amplifier 11 has a third leg 113 connectedly provided on a first leg 121 of a second counter-amplifier 12. The second counter-amplifier 12 has a third leg 123 connected to two resistors 13 that are connected in parallel. One of the resistors 13 is connected in series to a capacitor 15. The capacitor 15 has an output end connected to an output end of an algorithm amplifier 14, and the output end of the capacitor 15 is connected to a first gate 16. The first gate 16 has an output end connected to a second gate 17. The second gate 17 has an output end connected to a display circuit 30. The display circuit 30 is adapted to display detection results obtained via the hardware detecting circuit 10. The display circuit 30 may be a diode or a display screen.

Furthermore, the first counter-amplifier 11 has a second leg 112 connected to a processing unit 20. The processing unit 20 is provided with a CPU 21 for processing and making judgments, and is connected to a ROM 22 and a RAM 23. The ROM 22 has stored therein frequency setting values and relevant data.

Referring again to FIG. 1, when the modem 100 is connected to a communications equipment, such as a telephone set, the CPU 21 of the processing unit 20 can judge whether the modem 100 in use based upon the frequency generated by the telephone line. If the modem 100 is not in use, the CPU 21 of the processing unit 20 will calculate the frequency (DM 207.23 in this embodiment) in the modem 100, and store the same in the RAM 23. At the same time, the data relevant to the frequency setting values stored in the ROM 22 are retrieved and judged. When the signal frequency is greater than the set value, the hardware detecting circuit 10 will be actuated. When the signal frequency is smaller than the set value, the hardware detecting circuit 10 will be closed. In addition, when the signal frequency is less than "0", the hardware detecting circuit 10 will be closed, and the modem 100 will be triggered to emit pulse signals.

When the hardware detecting circuit 10 is actuated, the first and second counter-amplifiers 11, 12 are controllable to actuate or close a charging circuit consisting of the resistors 13, the algorithm amplifier 14, and the capacitor 15. Furthermore, the first leg 111 of the first counter-amplifier 11 is adapted to receive pulse signals generated by the modem 100, whereas the second leg 112 thereof is adapted to actuate or close the pulse signals generated by the modem 100. In other words, when the potential of the second leg 112 of the first counter-amplifier 11 is high, it receives pulse signals generated by the modem 100. On the contrary, when the potential of the second leg 112 is low, reception of the pulse signals generated by the modem 100 is stopped. Furthermore, when a pulse passes through the third leg 123 of the second counter-amplifier 12, charging will quickly proceed by means of the resistors 13 and capacitor 15 that are connected therewith, causing the potential of the output end of the second gate 17 to be high in a short while. And after passage of the pulse, i.e., when the potential of the second leg 112 of the first counter-amplifier 11 is low, the capacitor 15 will gradually discharge through the resistors 13 connected thereto. Low potential indicates that the telephone that is connected to the modem 100 is currently used by other equipment, or that the electrical connection is poor. High potential indicates that the telephone that is connected to the modem 100 is currently not connected with any other equipment. As for the existence of pulses, it indicates intervention from other equipment.

Although the present invention has been illustrated and described with reference to the preferred embodiment thereof, it should be understood that it is in no way limited to the details of such embodiment but is capable of numerous modifications within the scope of the appended claims.

What is claimed is:

1. A telephone line state detecting device, that utilizes pulses generated by a telephone line to judge use state of said telephone line, said device being provided with a hardware detecting circuit, said hardware detecting circuit being provided with a first counter-amplifier, said first counter-amplifier having a first leg connected to a signal line of said telephone line, a second leg connected to a processing unit, and a third leg connected to a first leg of a second counter-amplifier, said second counter-amplifier having a third leg connected to parallel resistors, one of said resistors being connected in series to an algorithm amplifier, the other of said resistors being connected in series to a capacitor, said capacitor having an output end connected to an output end of said algorithm amplifier, said output end of said capacitor being connected to a first counter-gate, said first counter-gate having an output end connected to a second counter-gate, said second counter-gate having an output end connected to a display circuit that can display detection results.

2. The telephone line state detecting device as defined in claim 1, wherein said processing unit includes a CPU for purposes of judgment, a ROM for storing frequency setting values and relevant data, and a RAM for temporary storage of data.

3. The telephone line state detecting device as defined in claim 1, wherein said display circuit is a diode.

4. The telephone line state detecting device as defined in claim 1, wherein display circuit is a display screen.

* * * * *